(12) United States Patent
Sejkora

(10) Patent No.: US 6,700,716 B2
(45) Date of Patent: Mar. 2, 2004

(54) OPTICAL ELEMENT WITH A MICROPRISM STRUCTURE FOR DEFLECTING LIGHT BEAMS

(75) Inventor: Günther Sejkora, Schwarzenberg (AT)

(73) Assignee: Zumtobel Staff GmbH, Dornbirn (AT)

( * ) Notice: Subject to any disclaimer, the term of this patent is extended or adjusted under 35 U.S.C. 154(b) by 186 days.

(21) Appl. No.: 09/764,421

(22) Filed: Jan. 19, 2001

(65) Prior Publication Data

US 2001/0040742 A1 Nov. 15, 2001

Related U.S. Application Data

(63) Continuation of application No. PCT/EP00/03609, filed on Apr. 20, 2000.

(51) Int. Cl.$^7$ .................. G02B 5/04; G02B 27/00; B29D 11/00; B28B 3/00; B44C 1/22
(52) U.S. Cl. .................. 359/834; 359/837; 359/900; 359/741; 359/627; 359/613; 359/592; 264/1.37; 264/2.5; 264/319; 216/24; 216/52; 216/94
(58) Field of Search .................. 359/459, 592, 359/597, 613, 614, 625, 627, 726, 741, 742, 833, 834, 837, 893, 900; 362/327; 385/129, 133, 146; 264/1.1, 1.37, 2.5, 319; 216/24, 52, 65, 94

(56) References Cited

U.S. PATENT DOCUMENTS

| | | | |
|---|---|---|---|
| 720,386 A | * | 2/1903 | Wadsworth |
| 2,738,706 A | * | 3/1956 | Thompson, Jr. |
| 3,129,895 A | * | 4/1964 | Franck |
| 3,351,753 A | * | 11/1967 | Berger |
| 3,594,070 A | * | 7/1971 | Whitehead |
| 3,760,178 A | | 9/1973 | Miller .................. 240/106 R |
| 4,074,126 A | * | 2/1978 | Dey |
| 4,240,692 A | * | 12/1980 | Winston |
| 4,418,986 A | * | 12/1983 | Yata et al. |
| 4,573,764 A | * | 3/1986 | Bradley |
| 4,984,144 A | * | 1/1991 | Cobb, Jr. et al. |
| 5,035,486 A | * | 7/1991 | Inokuchi |
| 5,204,160 A | * | 4/1993 | Rouser |
| 5,481,385 A | * | 1/1996 | Zimmerman et al. |
| 5,521,725 A | | 5/1996 | Beeson et al. .................. 359/40 |
| 5,598,281 A | | 1/1997 | Zimmerman et al. .......... 359/5 |
| 5,718,497 A | * | 2/1998 | Yokoyama et al. ......... 362/327 |
| 5,839,823 A | | 11/1998 | Hou et al. .................. 362/327 |
| 5,995,690 A | * | 11/1999 | Kotz et al. .................. 385/146 |
| 6,049,649 A | * | 4/2000 | Arai |
| 6,075,649 A | * | 6/2000 | Naito .................. 385/146 |

FOREIGN PATENT DOCUMENTS

| | | |
|---|---|---|
| AT | 403 403 B | 2/1998 |
| GB | 1 266 129 A | 3/1972 |
| WO | WO 97 36131 A | 10/1997 |

OTHER PUBLICATIONS

U.S. patent application Ser. No. 09/764,423 filed Jan. 19, 2001, group No. 2875, examiner unknown.
U.S. patents application Ser. No. 09/612,947 filed Jul. 10, 2000.
U.S. patent application Ser. No. 09/580,192 filed May 26, 2000.

* cited by examiner

Primary Examiner—Ricky D. Shafer
(74) Attorney, Agent, or Firm—Fitzpatrick, Cella, Harper & Scinto

(57) ABSTRACT

An optical element (10, 10', 10") for deflecting light beams (18, 19), which enter and re-emerge from the latter, in such a way that their angle of emergence ($\gamma$) is limited, in particular for use as a luminaire-cover, having a plate-like core (11, 11', 11") of transparent material which on one side is occupied by microprisms (12, 13) that taper—starting from their root (15)—forming furrows (22), wherein all of the top surfaces (14) of the microprisms form the light-entry face and the other side (21) of the core forms the light-emergence face, and wherein the top surfaces (14) of the microprisms are formed convexly or concavely in a continuous or non-continuous manner, and also a method for producing the optical element (10, 10', 10").

10 Claims, 5 Drawing Sheets

US 6,700,716 B2

OPTICAL ELEMENT WITH A MICROPRISM STRUCTURE FOR DEFLECTING LIGHT BEAMS

CROSS REFERENCE TO RELATED APPLICATIONS

This is a Continuation of copending International Application No. PCT/EP00/03609, filed Apr. 20, 2000 and published in German, but not in English, on Nov. 30, 2000, the priority of which is hereby claimed.

BACKGROUND OF THE INVENTION

1. Field of the Invention

The present invention relates to an optical element with a microprism structure, in particular for use as a cover for a luminaire and to a method for producing the same.

As a result of using such optical elements or luminaire-covers, the angle of emergence of light beams from a luminaire, for example, is to be limited in order to avoid or at least diminish any dazzlement for the viewer. In addition, of course, such an element also provides mechanical protection for the luminaire and in particular for the light source in the interior of the luminaire.

2. Description of the Related Art

An optical element of the kind mentioned by way of introduction is known, for example, from Austrian Patent AT-B-403,403. The known optical element, which is used as a luminaire-cover, has, on its side facing the lamp, pyramidal profiled portions that are arranged in rows and lines, so-called microprisms, which are formed as truncated pyramids and have an upper boundary face (light-entry face) that lies parallel to the base (light-emergence face). The whole luminaire-cover is made totally of a crystal-clear or transparent material.

A truncated pyramid or microprism according to AT-B-403,403 is shown in FIG. 1 for the purpose of explaining the problem which the present invention seeks to solve. As described in greater detail in the patent specification, the known microprism 1 has a top surface 2 which serves as a light-entry face, a root 3 which is arranged so as to be parallel to the latter and serves as a light-emergence face, and obliquely extending side walls 4 in such a way that the microprism 1 assumes the shape of a truncated pyramid. The angle of emergence γ of the emerging light beams in relation to the perpendicular to the light-emergence face 3 is to amount to at most approximately $\gamma_{max} \approx 60-70°$, preferably $\gamma_{max} \approx 60°$, in order to avoid any dazzlement for the viewer when looking at the luminaire from the side. In order to achieve the highest possible degree of optical efficiency at the same time, an optimum ratio of the dimensions of the truncated pyramid d:h that is dependent upon the refractive index n of the material of the truncated pyramid emerges for the microprism 1 made of transparent material. Furthermore, an optimum furrow angle δ between adjacent microprisms 1 of approximately 8–9° also emerges with a grid dimension of the microprisms of approximately 700 μm.

Given the parameters mentioned above, even for those light beams that strike the edges 5 directly or strike immediately next to the edges 5 of the truncated pyramid 1 and just pass by the edges 6 between the truncated pyramids 1, the result is that they emerge from the plane of the light-emergence face 3 at an angle of emergence of γ<60°.

It has, however, been found in practice that in terms of manufacturing techniques it is extremely difficult or almost impossible to observe a furrow angle δ of approximately 8–9°. Currently, furrow angles δ of approximately 15° can be realized with a sufficiently high level of precision and reproducibility. Whilst even with a realistic furrow angle δ≈15°, an angle of emergence of $\gamma_{max} \approx 60°$ can be achieved, given a constant height h of the truncated pyramid 1 the consequence of this though is that on account of the thus diminished area of the light-entry face 2 the degree of optical efficiency of the luminaire-cover is reduced in a corresponding manner from approximately 75–80% to approximately 65%. Alternatively, in order to maintain the extent of the light-entry face 2 the height h of the truncated pyramid 1 could also be diminished. In this case, however, the maximum light-emergence angle $\gamma_{max} \approx 60°$ would no longer be observed, since light beams, which enter the microprism 1 directly at the edges 5 of the light-entry faces 2 and just pass by the edges 6 between adjacent truncated pyramids 1, leave the luminaire-cover at a flatter angle.

A further luminaire-cover or a further optical element of the kind mentioned by way of introduction is known, for example, from WO 97/36131. The microprism structure disclosed in this printed specification has, on the one hand, on the side walls of the truncated pyramids a reflective cover in order to prevent light from emerging from the side walls of the microprisms and reducing the degree of efficiency of the luminaire-arrangement and, on the other hand, on the side of the light-emergence faces of the microprisms a lens system in order to concentrate the light beams in a direction substantially perpendicularly in relation to the plane of the light-emergence face. However, the structure of this luminaire-cover is comparatively complicated and therefore more expensive in terms of manufacturing techniques in comparison with the luminaire-cover known from AT-B-403,403.

Basing considerations on the afore-mentioned prior art, it is an object of the present invention to provide an optical element of the kind mentioned by way of introduction that avoids the disadvantages described above in the case of the prior art and which in particular with a high degree of efficiency in terms of lighting techniques guarantees an angle of emergence of the light beams from the optical element with which dazzlement of the viewer is avoided.

SUMMARY OF THE INVENTION

This object is achieved by means of an optical element according to the present invention.

Owing to the fact that the light-entry face of the optical element formed by the top surfaces of the microprisms are formed convexly or concavely in a continuous or non-continuous manner, the light beams coming from a lamp strike the light-entry face of the element at a different angle of incidence than in the case of a light-entry face that is aligned so as to be parallel to the light-emergence face. As a result of suitable selection of the curvature or degree of curvature which besides also depends upon the material of the element core and in particular upon its refractive index, the light beams can only emerge from the light-emergence face at an angle of emergence of at most approximately 60° in relation to the perpendicular of the light-emergence face without the degree of efficiency of the optical element in terms of lighting techniques being diminished thereby. A concave formation of the top surfaces of the microprisms causes the light beams, which impinge upon the top surfaces, to be refracted into the microprism structure at steeper angles and not to leave the optical element at an angle that is too flat. A convex formation of the top surfaces of the microprisms, on the other hand, causes the light beams, which impinge upon the top surfaces at a flat angle, to be refracted into the microprism structure at flatter angles, to be totally reflected therefore at the opposing structure flank and to leave the optical element at a sufficiently small angle of emergence.

The formation of the top surfaces of the microprisms is preferably realized by means of a convex or concave curvature or step formation, with the curvature or step formation not necessarily having to extend over all of the top surfaces.

The plate-like core of the optical element in accordance with the present invention is either mechanically worked out of a transparent block or produced by pouring or injecting the transparent material into an appropriate mould and subsequently applying pressure thereto.

Further advantageous configurations and further developments of the present invention are shown and described herein.

BRIEF DESCRIPTION OF THE DRAWINGS

Various preferred exemplary embodiments of the present invention are explained in greater detail in the following with reference to the enclosed drawing, in which:

FIG. 12 is a view similar to FIG. 4 but showing interspaces or furrows between the microprisims completely filled in.

DETAILED DESCRIPTION OF THE PREFERRED EMBODIMENTS

Figure 2:
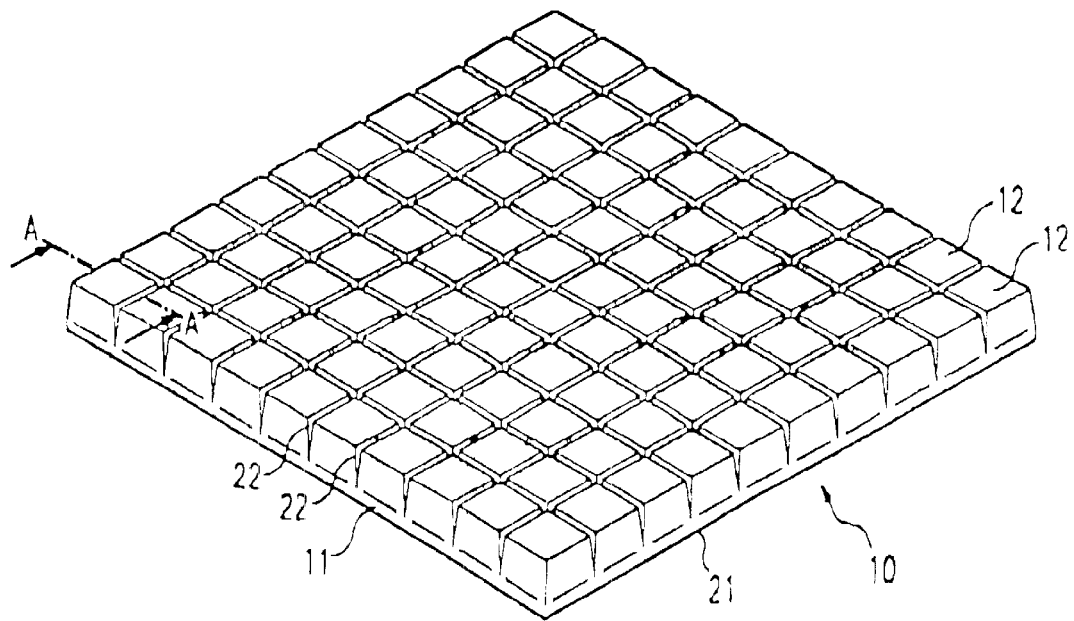
FIG. 2 shows a diagrammatic perspective representation of a first exemplary embodiment of an optical element in accordance with the invention.
Figure 3:
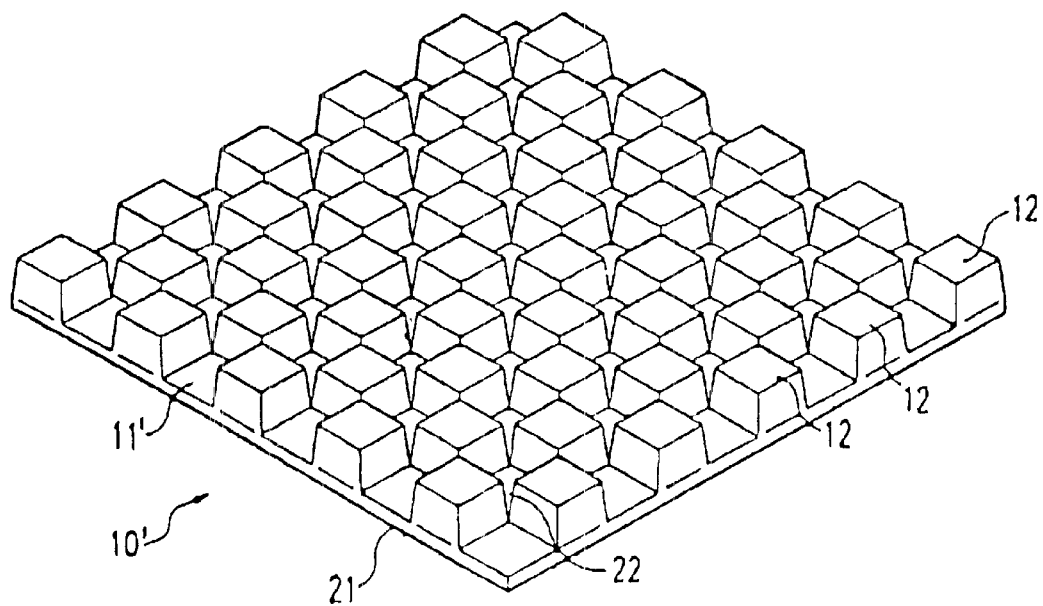
FIG. 3 shows a diagrammatic perspective representation of a second exemplary embodiment of an optical element in accordance with the invention.
Figure 4:
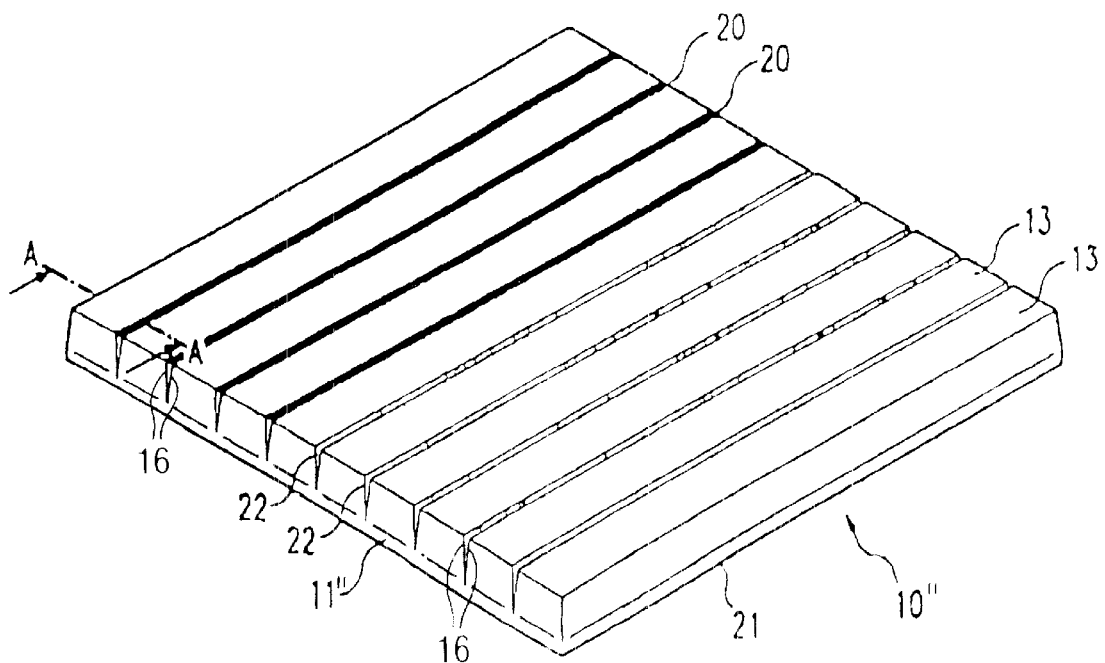
FIG. 4 shows a diagrammatic perspective representation of a third exemplary embodiment of an optical element in accordance with the invention.

FIGS. 2 to 4 show, in a perspective representation, three different optical elements 10, 10' and 10" respectively, which are used, for example, as luminaire-covers, from the side that faces the lamp (not shown) of the luminaire. The optical elements 10, 10', 10" consist of a material which is permeable to light or transparent, such as transparent plastics materials, such as, for example, acrylic glass. The optical elements 10, 10', 10" each consist of a plate-like core 11, 11' and 11" respectively made of transparent material, which on one side is occupied by a plurality of microprisms 12, 13. In this connection, the microprisms 12, 13 are formed in such a way that they taper—starting from their roots 15—forming furrows 22. All of the top surfaces 14 of the microprisms 12, 13 then form the light-entry face of the optical element, and the other side 21 of the core forms the light-emergence face of the optical element.

The element core 11, 11', 11" of the optical element 10, 10', 10" in accordance with the invention can be produced in different ways from a transparent material, preferably a transparent plastics material, such as acrylic glass. The production by means of a so-called injection-moulding embossing method is to be mentioned first here. This method is similar to the plastics injection-moulding method that is generally known, yet is effected with a comparatively low injection pressure. After the transparent material has been injected into the mould, a mechanical pressure is exerted on the still liquid material so that the latter can penetrate into the structures of the mould. Furthermore, it is also possible to produce the element core 1 by means of a hot-embossing method in which the transparent material in liquid form is poured into an appropriate mould and subsequently pressure is likewise applied thereto in order to realize the embossing.

Furthermore, there is also the possibility of providing a transparent plastics block with the furrows mechanically. This can be effected, for example, by cutting, for example with a diamond cutter, or by means of a laser beam.

A further possibility for producing the transparent core 11, 11', 11" consists in pressing the liquid plastics material through an extrusion head. In this case though it is only possible to produce linear structures of microprisms 13.

In the first exemplary embodiment of FIG. 2, the optical element 10 has, on the side that faces the lamp of the luminaire, profiled portions which are arranged in lines and rows in the form of microprisms 12, each of the same dimension and with a square base. The microprisms 12 are only shown diagrammatically in FIG. 2, as they are as well, besides, in FIGS. 3 and 4, their shape corresponding, for example, to one of the exemplary embodiments that are shown in FIGS. 5–10 and which are described further below. As a result of the matrix-like arrangement of the microprisms 12 of the first exemplary embodiment of the optical element, crosswise dazzlement-suppression is achieved in both directions.

Whilst in the first exemplary embodiment of the optical element 10 the microprisms 12 directly follow one another in succession in rows and lines, the microprisms 12 in the second exemplary embodiment of the optical element 10' that is shown in FIG. 3 are arranged in the manner of a checkerboard, that is, between two successive microprisms 12 in each case in the line-direction and in the row-direction one microprism structure is left out, with the area that is left free corresponding in terms of its length and breadth to the base area of one microprism 12. The microprisms in this second exemplary embodiment also preferably have a square base. However, it is possible, both in the case of the first and in the case of the second exemplary embodiment, to provide a different polygon, preferably a regular polygon, as the base.

The third exemplary embodiment of the optical element 10" in accordance with FIG. 4 differs from the two exemplary embodiments described above in that the microprisms 13 of the optical element 10" extend in one direction, for example the line-direction, over the entire length of the optical element 10", whilst in the other direction, for example the row-direction, as in the case of the optical elements 10, 10' of FIGS. 2 and 3, they are arranged so as to follow one another in succession. Analogously to the second exemplary embodiment it is also possible here to leave out a respective row between two microprism structures 13.

As a result of the linearly extending microprisms 13, crosswise dazzlement-suppression is only achieved perpendicularly in relation to the direction of extension of the microprisms 13. The optical element 10" in accordance with the third exemplary embodiment is therefore suitable in particular for luminaires in which elongated lamps, such as, for example, fluorescent tubes, are used. The longitudinal direction of the lamp then runs parallel to the direction of extension of the linear microprisms 13.

As indicated in FIG. 4 moreover, the interspaces between the adjacent microprisms 13 are preferably covered with a reflective material 20, for example a metal foil with a high reflecting power. As a result, only that light from the lamp that strikes the top surfaces 14 of the microprisms 13 forming the light-entry face is radiated through the optical element 10". The light beams, which impinge upon the cover 20, are reflected back into the interior of the luminaire and are reflected by a reflector, arranged behind the lamp in the usual manner, back in the direction of the optical element.

Figure 12:
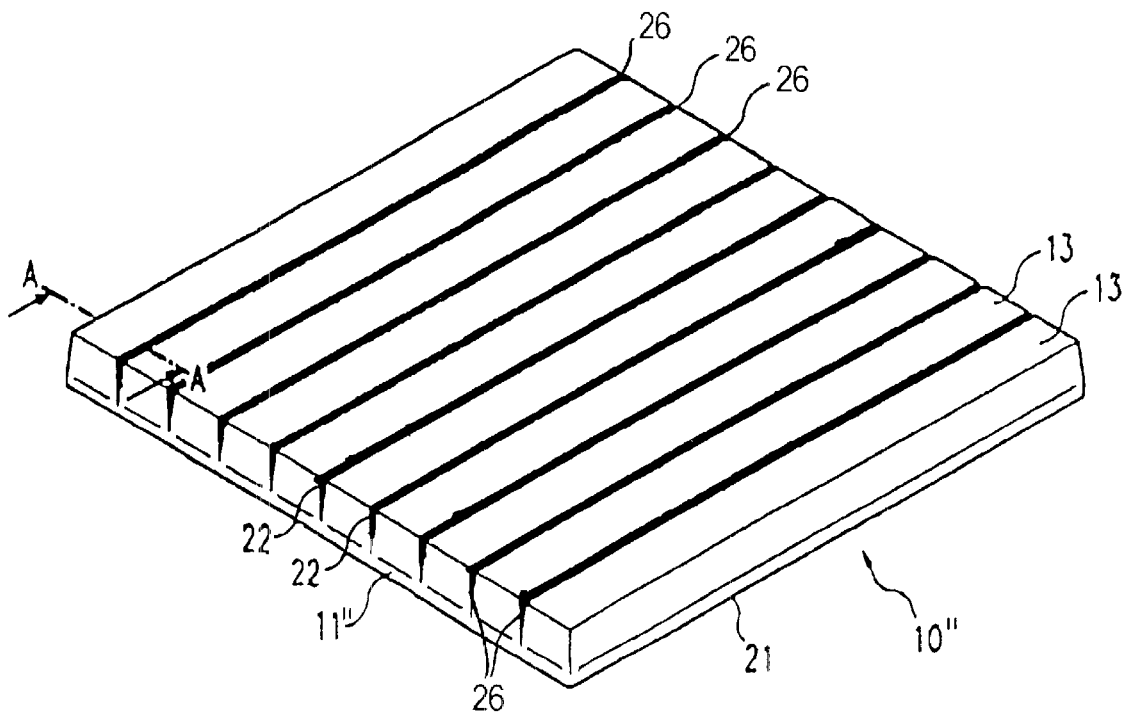

As a result of using such a reflective cover 20, it is possible to increase the degree of efficiency of the optical element further. Instead of the cover 20 that is shown in part in FIG. 4, it is also possible to fill the interspaces or furrows 22 between the microprisms 13 completely with a reflective material as shown at 26 in FIG. 12. In this way, the side walls 16 of the microprisms 13 are also formed so as to be totally reflective so that light beams, which impinge from within upon these side walls 16, are not able to leave the microprisms 13. As an alternative to this, the side walls 16 of the microprisms 13 can also be coated with a reflective matetrial or be formed so as to be reflective in a different way.

The measures mentioned here with reference to the example of the optical element 10", of FIG. 4 can of course also be applied in an analogous manner in the case of the first two exemplary embodiments of FIGS. 2 and 3.

In FIGS. 5 to 10, different exemplary embodiments of microprisms 12, 13 are shown in section in accordance with the line A—A of FIG. 2 or FIG. 4 respectively.

The microprisms 12, 13 described in the following can be used selectively in the optical elements 10, 10', 10" of FIGS. 2 to 4.

Figure 5:
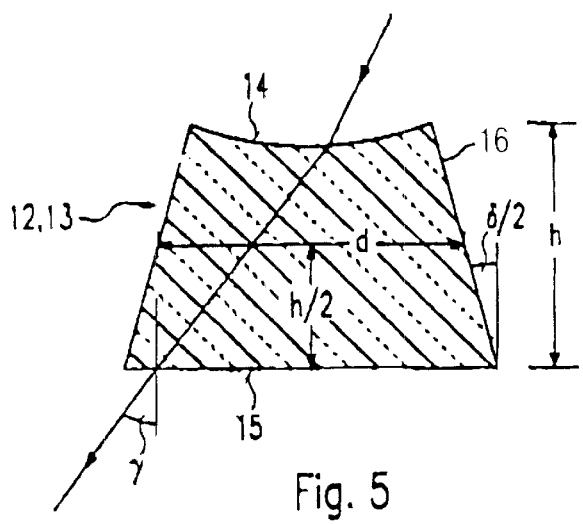
FIG. 5 shows a first exemplary embodiment of a microprism structure in accordance with the present invention in section in accordance with the line A—A of FIG. 2 or FIG. 4 respectively.

The microprism structure 12, 13 shown in section in FIG. 5 has a root 15, which substantially forms the light-emergence face 21 of the optical element, and a top surface 14 that is arranged so as to be substantially parallel to the latter and forms the light-entry face. The side walls 16 of the microprism 12, 13 extend slightly inwards in an inclined manner sloping from the root 15 to the top surface 14 so that the externally tapering structure is produced. This angle of inclination δ/2 of the side faces 16 determines the furrow angle δ between adjacent microprisms 12, 13 of the optical element 10, 10". The microprism 12, 13 preferably has a square or rectangular shape, yet can also be any other polygon, preferably a regular polygon.

The light-entry face 14 of the microprism 12, 13 in the present first exemplary embodiment of FIG. 5 is curved concavely, that is, inwards. The degree of curvature required depends upon the dimensions of the microprism 12, 13, more precisely upon the ratio d:h and upon the refractive index n of the transparent material of the microprism 12, 13. The person skilled in the art in the field of optics, however, will easily be able to determine the degree of curvature of the light-entry face 14 required in the individual case in order to attain a maximum light-emergence angle $\gamma_{max}$ of approximately 60–70°. The effect of the curved light-entry face 14 is described further below in greater detail with reference to FIGS. 11A and B.

Figure 6:
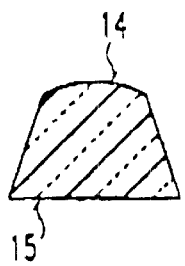
FIG. 6 shows a second exemplary embodiment of a microprism structure in accordance with the present invention in section.

The second exemplary embodiment of the microprism 12, 13 shown in FIG. 6 differs from the first exemplary embodiment described above in that the light-entry face 14 is curved convexly, that is, outwards.

Instead of a concavely or convexly curved light-entry face 14 it is also possible to provide a stepped or edged light-entry face 14, as shown in the exemplary embodiments of FIGS. 7 to 10.

Figure 7:
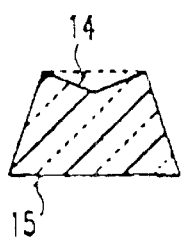
FIG. 7 shows a third exemplary embodiment of a microprism structure in accordance with the present invention in section.
Figure 8:
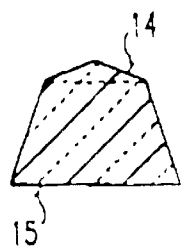
FIG. 8 shows a fourth exemplary embodiment of a microprism structure in accordance with the present invention in section.

In the case of the two exemplary embodiments of FIGS. 7 and 8, the light-entry face 14 is composed of partial faces which converge in the centre of the light-entry face 14 below or above the (imaginary) plane of the light-entry face and thus form a sunken or raised structure. Given a square base of the microprism 12 for example, these partial faces of the light-entry face 14 are triangular.

Figure 9:
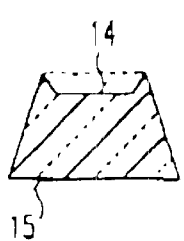
FIG. 9 shows a fifth exemplary embodiment of a microprism structure in accordance with the present invention in section.
Figure 10:
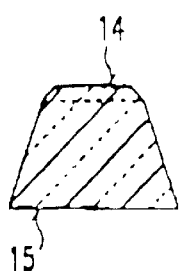
FIG. 10 shows a sixth exemplary embodiment of a microprism structure in accordance with the present invention in section.

In the fifth and the sixth exemplary embodiments of FIGS. 9 and 10 respectively, the light-entry face 14 is likewise composed of a plurality of partial faces. One partial face is arranged so as to be parallel to the light-emergence face 15 and the (imaginary) plane of the light-entry face 14 substantially in the centre of the light-entry face 14 and below or above the (imaginary) plane of the light-entry face 14. The other partial faces connect this central partial face to the side walls 16 of the microprism 12, 13.

Of course, within the scope of the present invention it is also possible to select combinations of the embodiments of the microprism described above with reference to FIGS. 5 to 10 and also further similar configurations. In this connection, the top surfaces 14 are formed concavely or convexly either in a continuous or non-continuous manner, that is, concavely or convexly always at least in one partial region of the top surfaces 14.

The effect of the configuration of the microprism structure 12, 13 in accordance with the invention on the mode of operation of the optical element 10, 10', 10", in comparison with a conventional microprism structure 12, 13, will now be explained with reference to FIGS. 11A and B.

Figure 1:
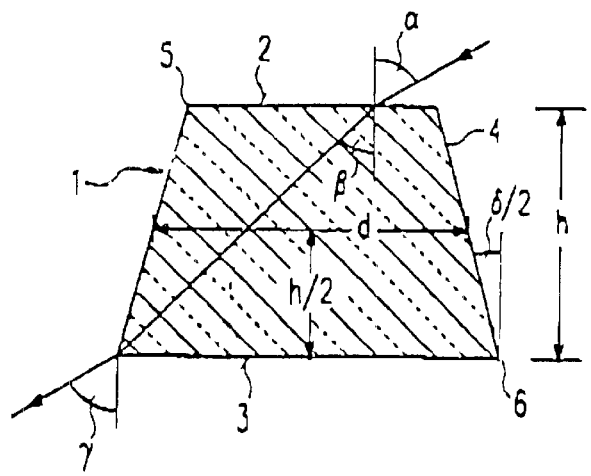
FIG. 1 shows, in section, a microprism structure of a luminaire-cover that is known from the prior art.
Figure 11A:
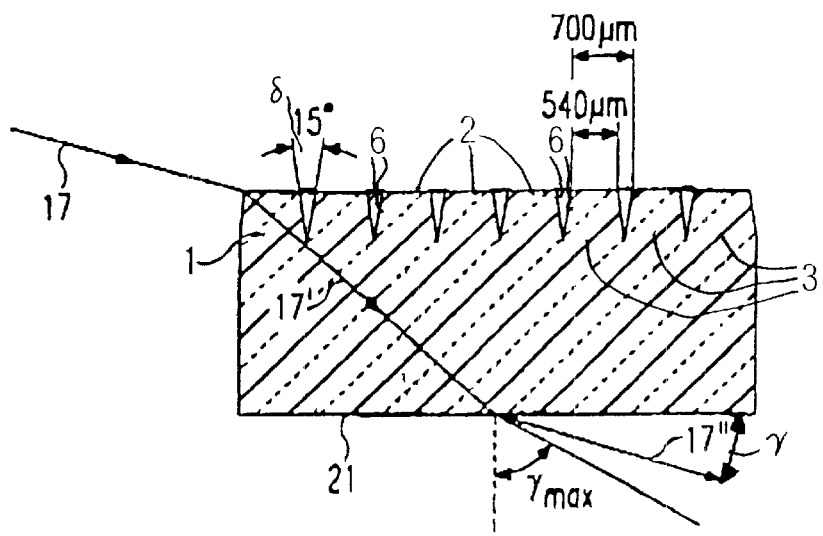
FIG. 11A shows a representation of the course of a light beam through a conventional optical element.

In the first instance in FIG. 11A a conventional optical element is shown in section. The furrow angle δ between adjacent microprisms 1 amounts to approximately 15°, the grid dimension d of the microprisms 1 amounts to approximately 700 μm and the breadth of the light-entry faces 2 of the microprisms amounts to approximately 500 μm so that a ration d:h of approximately 7:12 results. The dimensions d and h correspond to those shown in FIG. 1. In FIG. 11A by way of example an incident light beam 17 is shown that strikes the light-entry face 2 of the microprism structure 1 directly at the edge 5 at a flat angle of incidence. On account of the comparatively high refractive index n of the transparent material of the optical element, the light beam 17 is refracted towards the perpendicular with respect to the light-entry face 2. The refracted light beam 17' runs inside the core of the optical element just past the edge 6 between the adjacent microprisms 1 and strikes the light-emergence face 3 or in the extension the light-emergence face of the base. At the light-emergence face the light beam 17' is refracted, on account of the comparatively low refractive index of the surrounding region, away from the perpendicular with respect to the light-emergence face 3. The light beam 17″, which emerges from the optical element, has an angle of emergence γ, which is greater than the desired maximum angle of emergence $\gamma_{max}$ of approximately 60°. In the case of the conventional optical element, dazzlement for the viewer cannot therefore be completely precluded.

Figure 11B:
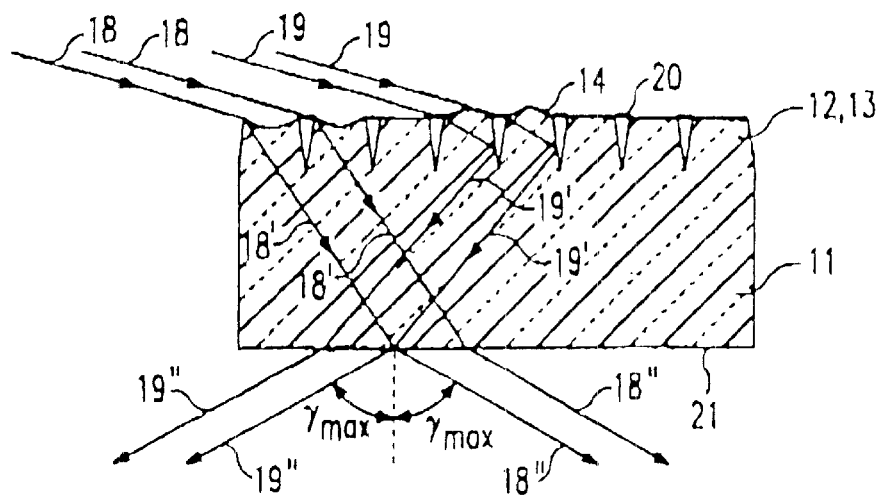
FIG. 11B shows a representation of the course of a plurality of exemplary light beams through an optical element in accordance with the present invention.

In contrast with the conventional optical element of FIG. 11A, in the optical element in accordance with the present invention of FIG. 11B microprism structures 12, 13 both with concavely formed light-entry faces 14 and with convexly formed light-entry faces 14 are shown in a drawing. By way of example, in each case two light beams 18, which strike the edges of the concavely formed light-entry faces 14, and two light beams 19, which strike the edges of the convexly formed light-entry faces 14, are shown. Moreover, the furrows 22 between the microprisms 12, 13 are provided with a reflective cover 20.

The light beams 18, which impinge upon the concavely formed or sunken light-entry face 14 in the region of the edges, in view of the different angle of incidence with respect to the light-entry face, in comparison with the course of the beam shown in FIG. 11A, are refracted to a greater extent towards the perpendicular with respect to the (imaginary) plane of the light-entry face so that the light beams 18′, which extend in the core 11, 11′, 11″ of the optical element 10, 10′, 10″, strike the light-emergence face 21 of the microprisms 12, 13 or the core 11, 11′, 11″ at a steeper angle. Whilst these light beams 18′ are likewise refracted away from the perpendicular with respect to the light-emergence face 15, their angle of emergence γ in this case does not exceed the maximum angle of emergence $\gamma_{max}$ of 60°.

A convex or raised formation of the light-entry face 14, on the other hand, causes the light beams 19, which impinge upon the light-entry face 14 in the region of the edges at a flat angle, in comparison with the course of the beam shown in FIG. 11A, to be refracted less towards the perpendicular with respect to the (imaginary) plane of the light-entry face so that the light beams 19′ strike the side faces 16 of the microprisms 12, 13 and are totally reflected at these. The consequence of this is that even the light beams 19′ strike the light-emergence face 21 of the microprisms 12, 13 or the core 11, 11′, 11″ at a steeper angle in comparison with the course of the beam shown in FIG. 11A and thus can leave (19″) the optical element at a sufficiently small angle of emergence γ.

What is claimed is:

1. Optical element for deflecting light beams which enter and re-emerge from said element with a limited angle of emergence, said optical element comprising:

a flat, plate-like core of transparent material and formed on one side with furrows which form a plurality of microprisms, each of which tapers from respective roots at said flat core, said microprisms each having a contoured top surface and flat side surfaces and being integrally formed with and extending upwardly from said flat, plate-like core of transparent material to a respective one of said top surfaces, said microprisms being directly joined to adjacent microprisms along their respective sides at said roots in an arrangement such that the microprisms directly follow one another in succession in adjacent lines or in adjacent lines and rows, said top surfaces of said microprisms forming light entry faces opposite to a light-emergence face on an opposite side of said core, said microprisms being provided with means to limit incident light such that only that light that strikes the contoured top surfaces of the microprisms is radiated through said optical element, said contoured top surfaces of the microprisms being formed convexly or concavely and in a continuous manner.

2. Optical element according to claim 1, wherein:

said top surfaces of said the microprisms are curved convexly or concavely.

3. Optical element according to claim 1, wherein:

said top surfaces of said microprisms are stepped convexly or concavely.

4. Optical element according to claim 1, wherein:

said microprisms have side faces which are reflective so that the light cannot emerge from said microprisms through said side faces.

5. Optical element according to claim 1, wherein:

said furrows are formed between adjacent microprisms, said furrows being formed by faces of said microprisms which are reflective so that the light beams can enter the optical element only through top surfaces thereof.

6. Optical element according to claim 5, wherein:

said furrows between adjacent microprisms are covered with a cover made of a reflective material.

7. Optical element according to claim 5, wherein:

said furrows between the adjacent microprisms are filled up with a reflective material.

8. In a method for producing an optical element according to claim 1, the step of mechanically working said plate-like core out of a transparent block.

9. The method according to claim 8, wherein:

said transparent block is worked by means of laser beams.

10. A method for producing an optical element according to claim 1, wherein:

the transparent material of said core is cast or injected into an appropriate mold and is subsequently subjected to pressure applied thereto.

* * * * *

UNITED STATES PATENT AND TRADEMARK OFFICE
CERTIFICATE OF CORRECTION

PATENT NO. : 6,700,716 B2
DATED : March 2, 2004
INVENTOR(S) : Günther Sejkora

It is certified that error appears in the above-identified patent and that said Letters Patent is hereby corrected as shown below:

<u>Title page,</u>
Item [73], Assignee, "Zumiobel" should read -- Zumtobel --.

Signed and Sealed this

Third Day of August, 2004

JON W. DUDAS
*Acting Director of the United States Patent and Trademark Office*